Dec. 25, 1962   R. T. GLASS   3,070,259
STICK INSERTER FOR CONFECTION MACHINES AND THE LIKE
Original Filed March 16, 1956   4 Sheets-Sheet 1
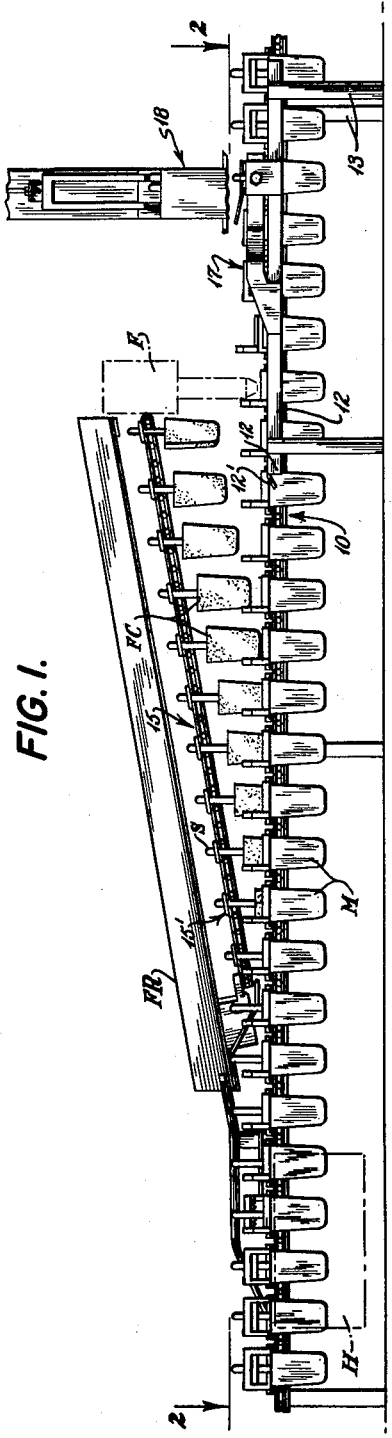
INVENTOR
*Robert Taylor Glass*
BY
ATTORNEYS Dec. 25, 1962  R. T. GLASS  3,070,259
STICK INSERTER FOR CONFECTION MACHINES AND THE LIKE
Original Filed March 16, 1956  4 Sheets-Sheet 2

INVENTOR
*Robert Taylor Glass*
BY *Beale and Jones*
ATTORNEYS

Dec. 25, 1962    R. T. GLASS    3,070,259
STICK INSERTER FOR CONFECTION MACHINES AND THE LIKE
Original Filed March 16, 1956    4 Sheets-Sheet 3

INVENTOR
*Robert Taylor Glass*
BY
ATTORNEYS

Dec. 25, 1962            R. T. GLASS            3,070,259

STICK INSERTER FOR CONFECTION MACHINES AND THE LIKE

Original Filed March 16, 1956            4 Sheets-Sheet 4

INVENTOR
Robert Taylor Glass

BY
ATTORNEYS

United States Patent Office 3,070,259
Patented Dec. 25, 1962

3,070,259
STICK INSERTER FOR CONFECTION MACHINES AND THE LIKE
Robert Taylor Glass, 409 W. 6th St., Austin, Tex.
Original application Mar. 16, 1956, Ser. No. 572,084, now Patent No. 2,953,997, dated Sept. 27, 1960. Divided and this application July 1, 1959, Ser. No. 831,684
6 Claims. (Cl. 221—11)

My invention is directed to improvements in confection machines and particularly to mechanism for inserting sticks in molds.

This application is a divisional application of application Serial Number 572,084, filed in the U.S. Patent Office on March 16, 1956, now U.S. Patent 2,953,997, issued September 27, 1960.

An object of my invention is to provide an endless conveyor type confection machine carrying removable molds having cooperating movable stick holders above the molds for supporting sticks therein and means for moving the stick holders to support and non-support stick position together with means for inserting the stick.

A further object of my invention is to provide in a confection machine a stick inserter mechanism for holding a plurality of rows of sticks which may be selectively brought into position under fingers for inserting the sticks into molds movable therebelow.

A still further object of my invention is to provide in a confection machine a sticker having a movable tray with a plurality of elongated stick receiving passages wherein selective passages may be brought into stick inserting position while other pasages are being refilled with sticks.

Still further objects and the entire scope of applicability of the present invention will become apparent from the detailed description given hereinafter. It should be understood, however, that the detailed description and specific examples are given by way of illustration only, and while indicating preferred embodiments of the invention are not given by way of limitation, since various changes and modifications within the spirit and scope of the invention will become apparent to those skilled in the art from this detailed description.

For a more complete understanding of the nature and scope of my invention, reference may be had to the drawings in which the figure are described as follows:

FIG. 1 is a side elevation of a portion of the confection machine showing the removing of the confections from the molds, the filling stage and the stick insertion stage;

FIG. 2 is a fragmentary plan view on a slightly enlarged scale viewed from line 22 of FIG. 1;

Throughout the description that follows in this specification like reference numerals refer to similar parts.

Figure 3:
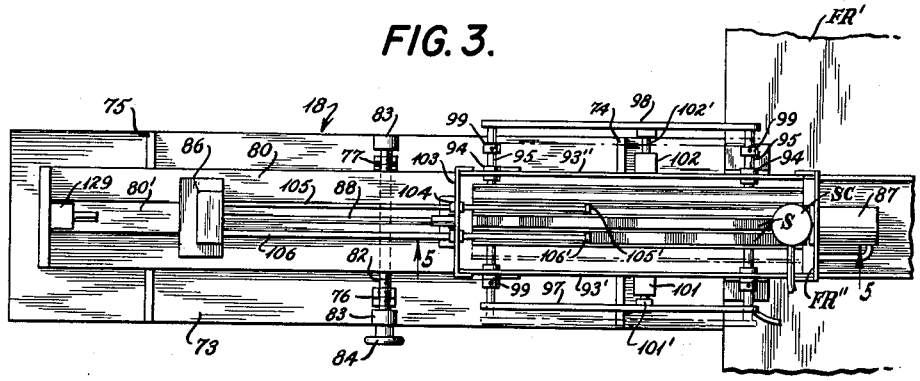
FIG. 3 is a top plan view on an enlarged scale of the stick inserter shown generally at the right hand end of FIG. 1.

Referring to FIG. 1 a portion of a frozen confection machine is generally indicated at 10 having longitudinal rails 11 and 12 indicated in FIG. 2 which are supported by spaced apart vertical legs 13 formed of angle iron members with longitudinal member 11 supporting an endless chain 14. In the portion of the machine disclosed and to which this invention relates there is generally indicated at 15 a cross conveyor chain which pulls the frozen confections FC by means of the stick S frozen therein from the molds M which are spaced apart and attached to the chain 14 as will hereinafter be described. In addition to the above just described as a portion of the frozen confection making machine, there is a heater H shown in outline at the left hand end of FIG. 1 which heats the molds and loosens the confections therein so that the cross chain 15 and the pullers 15' thereon, see my U.S. Patent 2,894,652, issued July 14, 1959, may pull the frozen confections from the molds M. Also shown in the machine as a part thereof is a filler F which fills the molds with confection fluid after the stick holders have been opened and the frozen confection FC removed by pulling so that a new confection may be frozen. Typical freezing compartments are shown in my U.S. patent, 2,925,052, which issued February 16, 1960. After the molds M have been filled they pass to a cam station generally indicated at 17 where the stick holders for the molds are closed and pass under a stick inserter generally indicated at 18 which inserts the sticks S into the stick holders such that each protrudes down into the mold and into the fluid confection material placed therein by the filler F.

The stick holding structure is disclosed specifically in my application Serial No. 572,084, filed March 16, 1956, of which the present application is a division. Briefly, as shown in FIGS. 5 and 9 through 11, the stick holding structure includes a first stick holder member 25 and a second stick holder member 26 both members being pivotally mounted on the mold bracket 21 secured to chain 14 by angle 19'—19. The stick holder members 25 each include vertical legs 27 and horizontal legs 30 and 31. Affixed to the upper edge of the stick holder member 25 is a transversely extending catch member 32 having a downwardly bent end portion 32' and an extreme tab outer end 32" which catches over the top edge of the second stick holder member 26. Stick holder member 26 is formed with vertical legs 33 carrying horizontal leg 39' and cross spring 38.

FIGS. 3—13 inclusive, are directed to the stick inserter generally indicated at 18 as shown in FIG. 1 and used in connection with the confection machine for inserting sticks S in between the stick holders 25 and 26 above the molds M as they pass beneath the stick inserter. The confection machine has an intermittent movement wherein it moves the endless chain with the molds M thereon in a step by step fashion so that there is a pause or stationary condition of the chain as it brings each successive mold M under the stick inserter 18. This is generally shown in the diagram of the electrical and pneumatic system for the stick inserter and the prime mover for the machine shown in FIG. 12. When the prime mover PM, a piston and cylinder mechanism, is in non-operating position or condition the stick inserter cylinder and piston SC has a movement of the piston down to insert a stick or sticks along with a retracting movement so that the pusher fingers are positioned above the next moved up stick or sticks to be inserted.

In FIG. 3 the frame portion FR' of the confection machine is shown broken away at the righthand side but it supports the stick inserted generally indicated at 18. The lefthand end of the stick inserter 18 is supported by leg 70, see FIG. 4. Leg 70 and frame FR' support the horizontal framework comprised of longitudinal angle bars 71 having suitable cross-framing angle bars 72, see FIG. 6. These frame members 71 and 72 support bed plate 73 or as alternative construction as a support member a fairly wide channel iron member may be used. The main purpose of this stick inserter assembly 18 is to provide mounting for a tray, to be described, containing rows of sticks such that a row or rows may be brought into feeding position while alternate standby rows are filled with replacing sticks and thus the machine is not interrupted for reloading.

Figure 5:
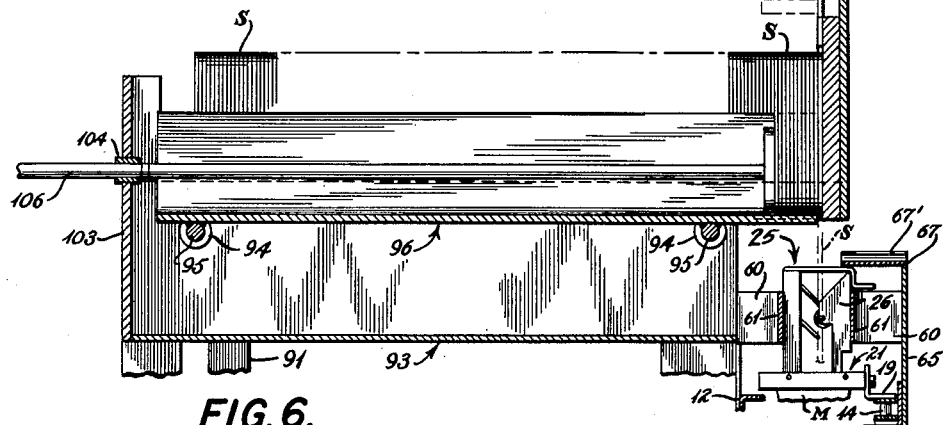
FIG. 5 is an enlarged sectional view along line 5—5 of FIG. 3 showing the stick tray with sticks therein and a stick being inserted into the stick holder above a mold.
Figure 6:
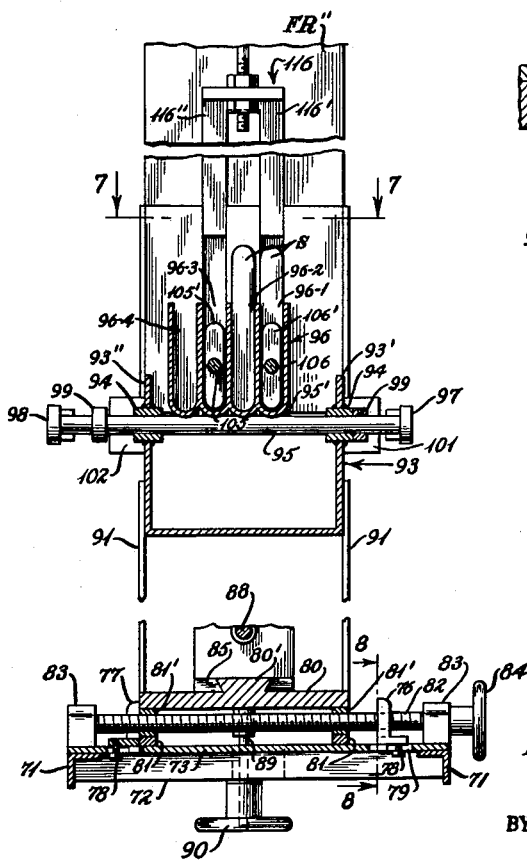
FIG. 6 is a fragmentary sectional view along line 6—6 of FIG. 4 on an enlarged scale showing the adjustable support for the stick tray.

Supported on the bed plate 73 toward each end are suitable transverse guide bars 74 and 75. A secondary bed plate 80 of narrower width than bed plate 73 has depending legs affixed thereto at either side in a form of elongated strips 81 as shown in FIG. 6 and these are notched to fit over the transverse guide bars 74 and 75, shown in FIGS. 3 and 4. Thus, the secondary bed plate 80 may be moved transverse of bed plate 73. In order to provide for adjustment, screw rod 82 is positioned at the longitudinal center and transverse to the bed plate 80 and is received in threaded bushings 81' in the elongated legs 81 while the ends of the screw 82 are supported in pillow boxes 83 secured at each side of the bed plate 73. A hand wheel 84 is provided on the screw 82 such that rotary adjustment thereof will move the bed plate 80 on the bed plate 73. To provide for limiting the sideways movement of plate 80 and the structure thereon, angle clips 76 and 77 are secured by cap screws 78 in transverse slots 79. The clips 76 and 77 are bifurcated to receive the screw rod 82. Bed plate 80 is formed with an upstanding dove-tail shaped male portion 80', see FIG. 6, which extends throughout a portion of its lefthand half to form a mating member for the female portion of the joint indicated at 85 in an upstanding slide 86. Also mounted for transverse adjustment with bed plate 80 is a power cylinder 87 of the double acting type having a piston rod 88 which is securely fastened at its outer end to the upstanding slide member 86. Bed plate 73 has transverse slots therein each of which receives a depending rod 89 secured to the underneath side of the secondary bed plate 80. The lower end of each rod 89 is threaded to receive a hand wheel 90 which is used to tighten against transverse bar members 72 so that the secondary bed plate 80 is held securely in adjusted position. Thus, to move the bed plate 80 it is necessary to slack off on hand wheels 90 before hand wheel 84 is turned to provide for transverse movement of the secondary bed 80. Bed plate 80 has at its righthand end, see FIG. 4, spaced apart upstanding supports 91 and 92 on either side which support a U-shaped body member generally indicated at 93, see FIG. 4, 5 and 6, which has longitudinal upstanding side members 93' and 93" that have spaced apart bushings 94 welded therein. Received in the bushings 94 are transverse support rods 95 which slide therein and which have fixedly attached thereto, as by welding at 95', a tray 96. Tray 96 has four longitudinal troughs or slots 96–1, 96–2, 96–3, and 96–4 therein which are of an elongated cross sectional shape so as to receive the relatively narrow in width and thin in thickness sticks S. Rods 95 have secured to the outer end thereof longitudinal strap members 97 and 98 respectively which serve as operating strap bars for solenoid actuators 101 and 102 to be described. Also threaded over rods 95 are movable collars 99 which may be secured in an adjusted position to limit sliding movement of the rods 95 and in turn the transverse movement of the tray 96. These collars 99 are provided with set screws so that they may be tightly secured in an adjusted position on the rods 95.

Figure 4:
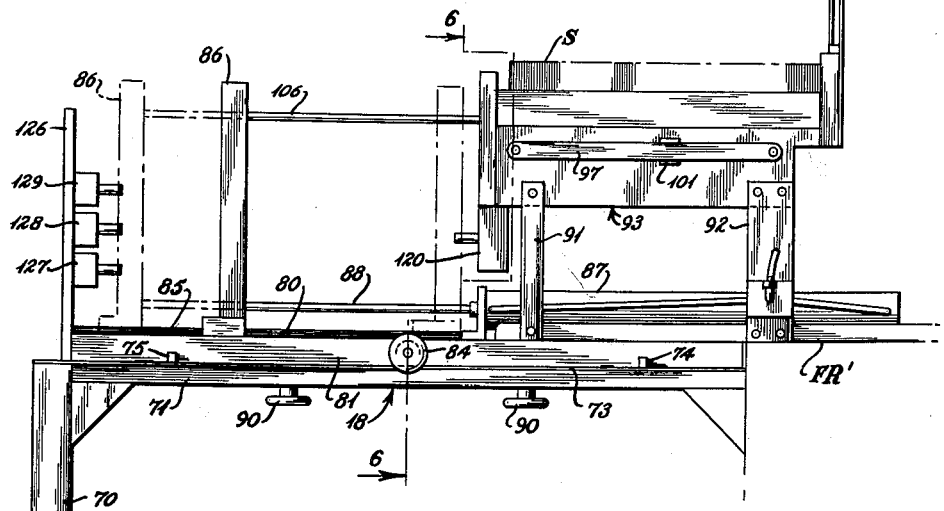
FIG. 4 is a side elevational view of the stick inserter shown in FIG. 3.
Figure 8:
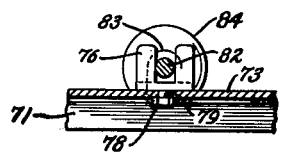
FIG. 8 is a cross-sectional view along line 8—8 of FIG. 6 showing an adjustable stop to limit one sideways movement of the stick tray support.

In FIG. 4 the solenoid 101 is shown secured to the upper portion of the U-shaped body member 93 and its armature 101' is connected to the operating bar 97, see FIG. 3; in like manner the solenoid 102 has its armature 102' connected to the operating bar 98 on the other side of the assembly. By energizing solenoid 101 tray 96 is moved to the left as shown in FIG. 6 so as to line up certain desired slots of slots 96–1 to 96–4 with fingers and slots to be described for the stick pusher.

Figure 7:
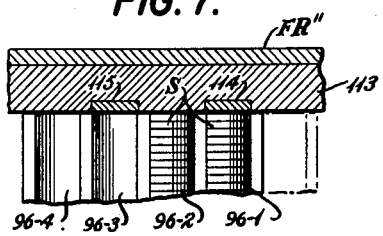
FIG. 7 is a cross-sectional view along line 7—7 of FIG. 6 on an enlarged scale depicting the top edge of a row of sticks and the vertical guide slots in the stick inserter mechanism.

Reference to FIG. 3 shows an end plate 103 attached to the U-shaped body member 93 and it is provided with spaced apart bushings 104 which receive stick pusher rods 105 and 106 secured at their outer ends to the upper portion of the upstanding slide 86 and carrying on their inner ends transverse elongated plates 105' and 106' of a similar width to that of the sticks S and slidable within the elongated slots or stick troughs 96–1 through 96–4 when aligned therewith so as to push the row of sticks S carried in a vertical position in the troughs. Thus, when the upstanding slide member 86 is motivated by the piston rod 88 attached to the power cylinder 87, the respective rows of sticks are moved to the right as viewed in FIGS. 3, 4, and 5. Reference to FIG. 5 shows that the extreme righthand stick of the stack or row of sticks lies in a vertical plan passing through the longitudinal center of the mold M positioned therebelow so that when the stick is pushed downwardly by the finger assembly 116 it is inserted into the stick holder members 25, 26 and projected down into the mold as shown in the two positions in FIGS. 9 and 11. In FIG. 5, frame portion FR" of the confection machine is shown as extending in a vertical attitude and it has secured thereto on its lefthand side, as shown in FIG. 7, a plate 113 of rectangular shape of the width of U-shaped body member 93. This plate 113 has spaced apart vertical slots 114 and 115 cut in its lefthand face, as best shown in FIG. 7, of a width sufficient to receive and guide the sticks S therein. The spacing of these slots 114 and 115 is the same as the spacing or the distance between two troughs such as 96–1 and 96–3.

In FIG. 4 the stick power cylinder SC of the pneumatic type is shown mounted on the upstanding frame portion FR". This cylinder SC may be adjustably mounted for movement in a vertical direction so as to position its vertical height and in turn the pusher finger assembly generally indicated at 116. The fingers 116' and 116" are best shown in FIG. 6. They move in slots 114 and 115 respectively, see FIG. 7, and have a head 117 thereon which is apertured to receive the piston rod 118 that is secured thereto with the lock nuts 118' and 118" and thus further adjustment of the bifurcated pusher finger assembly 116 may be made by means of adjusting the head 117 on the threaded rod 118. If it is desired to use a single row of sticks S, see FIG. 6, as at row 96–1 this row or trough is positioned under the finger 116' and the tray adjusted so that the auxiliary trough 96–2 may be filled while 96–1 is being emptied. Upon depletion of the sticks in trough 96–1 pusher rod 106 and its head 106' move to the extreme right and into the vertical slot 114, see FIG. 7, whereupon the plunger of contact switch 120 is moved by the upstanding slide member 86, see FIGS. 4 and 12, so that a circuit is completed from the power line L1—L2 to the four-way solenoid valve generally indicated at 121. Cylinder 87 is connected to the four-way solenoid operated air valve 121 by means of power lines 87'—87" and air is admitted under pressure from the supply line 122 through the valve 121 and thence the power line 87' to move the piston rod 88 to the left and carry with it the upstanding slide 86 which moves to the left as shown in FIG. 4. The solenoid operated valve 121 has electrical connection terminals a, b, and c. Terminal a is connected by connector 123 to one side of switch 120 while the other side of switch 120 is connected by connector 124 to the power line side L1. The other side L2 of the line is connected by a connector 125 to terminal c on the valve 121. Mounted on an upstanding bracket 126 on the bed plate 73, see FIG. 4, are three switches 127, 128, and 129. Switch 127 is a normally opened switch which is closed by depressing the button thereon. Switches 128 and 129 are of a type generally known as "on and off" switches which are opened and closed on alternate depression of their actuating buttons. When, on depression of both buttons, switch 128 is opened, switch 129 is closed and vice versa. These switches 127, 128, and 129 are in the path of movement of the upstanding slide member 86 and their plungers are actuated thereby. Switch 127 is connected by connector 130 on one side to the terminal b on the four-way solenoid operated valve 121 while the other side of the switch 127 is connected by connector 131 to the line 124 leading to power line L1 as at 131'. A common connector 132 connects power line L1 to one terminal of each of switches 128 and 129 as at 132' and 132''. Switch 128 has its other terminal connected by connector 133 to one side of the solenoid 101 while the other side of the solenoid is connected by connector 134 to a common connector line 135 leading to power line L2 and to one side of the other solenoid 102 for operating the tray 96. Switch 129 has its remaining terminal connected by connector 136 to the other terminal of solenoid 102.

After depletion of the sticks in trough 96–1, the switch 120 is actuated and trips the four-way solenoid valve 121 to move the upstanding slide 86 to the extreme left, as mentioned above. When the upstanding slide 86 reaches this extreme left position, it depresses the buttons of switches 127, 128 and 129. When the normally open circuit through switch 127 is closed, it trips the valve 121 to a position wherein the compressed air is directed through conduit 87'' to the left end of cylinder 87, consequently moving the slide member to the right and exerting a force on the stick members in the trough, forcing them toward the slots 114 and 115.

When the upstanding slide 86 is in its extreme left position the buttons of switches 128 and 129 are also depressed. As mentioned above, each of these switches closes its circuit on alternate depressions of the switch button. Thus, if on one simultaneous depression of the buttons switch 128 closes and 129 remains open, a subsequent simultaneous depression would cause switch 128 to remain open and 129 to close. Since each of these switches is series connected to a solenoid 101 or 102, actuation of either solenoid causes motion of the operating bars 97 and 98 and of the stick tray 96. Thus, whenever the upstanding slide member 86 depresses the switches 128 and 129, the tray member 96 will be shifted, thus lining up another row of sticks with the stick pusher rods 105 and 106, and with the slots 114 and 115. The depleted stick troughs may then be refilled.

In operation when the double acting power actuating mechanism PM of the pneumatic type is in a stop position and thus the conveyor chain 14 is in a stop condition, power cylinder SC for the stick actuating fork 116 moves downward and as the power cylinder PM is actuated, the piston rod 118 of power cylinder moves upward and withdraws the pusher assembly 116 from the slots 114 and 115 so that it is clear of any of the stick holders mounted on the molds M which pass therebelow by movement of chain 14 to which they are attached.

Figure 13:
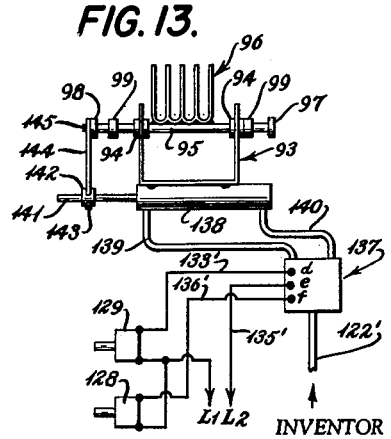
FIG. 13 is a diagram showing a modified form of actuator to move the stick tray back and forth which consists of a single power cylinder arrangement.
Figure 9:
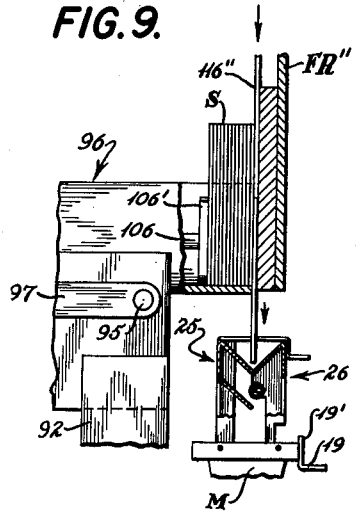
FIG. 9 is a fragmentary sectional view showing a group of sticks in the stick tray with a stick being inserted into the stick holder above the mold.
Figure 10:
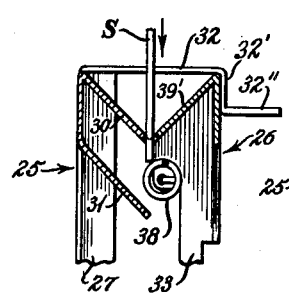
FIG. 10 is a fragmentary enlarged view of a portion of the structure of FIG. 9 showing a stick being thrust down into the stick holder.
Figure 11:
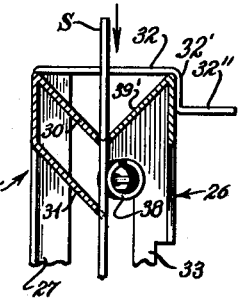
FIG. 11 is a view similar to FIG. 10 showing the stick further down in the stick holder.
Figure 12:
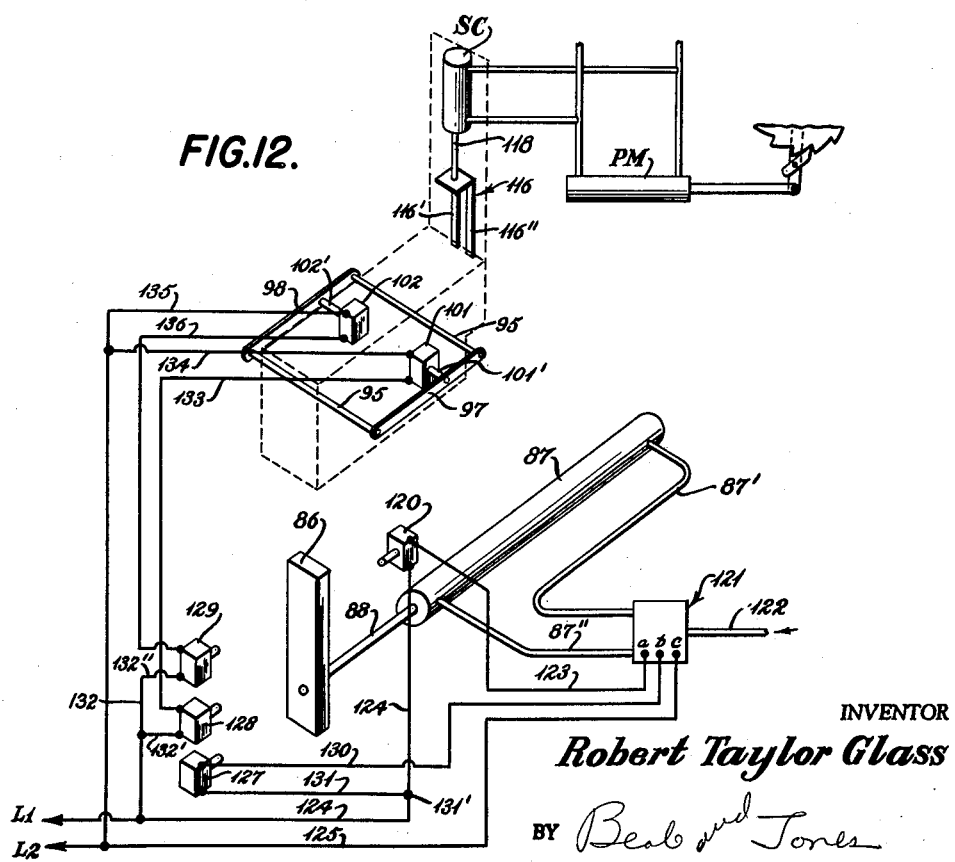
FIG. 12 is a diagrammatic wiring diagram and pneumatic power diagram for stick and main operating mechanism of the machine.

In FIG. 13 there is shown a modified form of actuator for the stick tray generally indicated at 93. A single power cylinder and piston arrangement 138 is utilized instead of the solenoids 101 and 102 at either side of the stick tray. The piston rod 141 of the power cylinder 138 has slipped thereover a collar 142 secured in adjusted position along the rod by a set screw 143. Fixed to collar 142 is an upstanding arm 144 which is apertured to receive a tap screw 145 which secures it to the adjacent bar 98 on the cross rods 95 supporting the stick tray 96. Thus, this one double acting power cylinder 138 through the valve actuator 137 serves to move the tray back and forth. Valve actuator 137 is similar to the actuator 121 shown in FIG. 12 and is under operation of the switches 128 and 129 which actuate in the same manner as set forth above for FIG. 12.

*Operation*

The troughs 96 of the stick inserter are mounted for movement longitudinal to the direction of travel of the chain carrying a stick holder 25—26 above a mold and into which a stick S is to be inserted as the stick holder and mold passes the stick inserting station. At the end of the troughs over the station of insertion there is a vertical guide member 113 having guide ways 114 and 115 for guiding a stick S as it is pushed vertically downward by a pusher 116 into the stick holder 25—26. Power means are provided, see FIG. 12, at 101 and 102 to move the troughs sideways to align a trough with a slot or troughs with slots, such as 114 and 115, if two sticks are being inserted at a time. An alternative power cylinder means 138 and control means are shown in FIG. 13 also for moving the troughs. The sticks S in each trough are selectively pushed lengthwise in their trough by a pusher 86, see FIGS. 4 and 12. As a trough becomes empty, control means are provided, see 128 and 129 in FIG. 12, to cause the solenoids 101 and 102 of FIG. 12 or in the modified construction, the cylinder 138 in FIG. 13 to move the troughs sideways to align a trough that is loaded with sticks with the vertical guide way 114 or 115.

Since it is obvious that certain further changes can be made in the foregoing constructions and arrangements without departing from the spirit and scope of this invention, it is intended that all matter shown in the accompanying drawings or described hereinbefore shall be interpreted as illustrative and not in a limiting sense.

I claim as my invention:

1. A stick inserter comprising, in combination, a support frame, a plurality of elongated troughs disposed in side by side parallel arrangement and adapted to receive a plurality of thin and narrow elongated sticks in stacked relation, support means attached to said frame and said troughs to support the latter above said frame for movement transverse to the direction of said elongated troughs, a guide support attached to said frame and disposed adjacent one end of said troughs and extending transversely to the elongated direction of said troughs, said guide support having a stick receiving guideway therein, power operated means for moving said troughs back and forth to bring the troughs selectively into alignment with said guideway, means movable into and out of said trough in alignment with said stick receiving guideway for pushing such sticks therein towards said guideway, operating means connected with said pusher means for such sticks in the said trough and said power operated means for moving said troughs responsive to an empty condition of sticks in the said trough to bring a loaded trough into aligned position with said guideway, and a stick pusher finger movable in said guideway for pushing a stick downward beyond the lower end of its trough.

2. A stick inserter according to claim 1 wherein said guide support for such sticks at the end of said troughs has a pair of individual stick receiving guideways therein spaced apart the distance between alternate troughs of said plurality of troughs and said stick pusher finger comprises a pair of spaced apart fingers for said spaced apart guideways.

3. A stick inserter according to claim 1 wherein said power operated means for the troughs includes a first double acting power cylinder for moving the troughs transversely from side to side, operating means connected with said means movable into and out of the trough for pushing such sticks in the trough comprising a second double acting power cylinder having a piston and a pusher plate attached thereto and insertable in said troughs, an electrically actuated valve means for connecting fluid power from a source to either end of said second power cylinder, a first electrical switch associated with said stick pusher operating means and actuated thereby when said pusher senses an empty condition in a trough, said first switch being connected to a source of electrical power and said valve means for actuating said valve means to apply power to the second power cylinder to retract the same and a second electrical switch associated with said pusher and actuated thereby when said pusher moves to the extreme opposite position from sensing an empty trough, said second switch being connected to a source of electrical power and said valve means for actuating said valve means to apply power to the second power cylinder to insert same in the trough, said operating means connected with said first power cylinder for the troughs comprises an electrically actuated fluid valve means for connecting a fluid power source to the ends of said first double acting power cylinder, a first on and off electrical switch connected with said last named valve means, a second on and off electrical switch connected with said last named valve means, said first and second on and off switches being positioned adjacent the retracted position of said pusher plate and actuated thereby and connected to an electrical power source whereby when one is off the other is on to energize said last named electrical actuated valve means alternately to move said first double acting power cylinder connected to said troughs to move said troughs transversely from side to side.

4. A stick inserter according to claim 3 wherein said frame includes a horizontally disposed base plate, said support means attached to the frame and supporting said troughs comprises a secondary base plate above said base plate, means mounting said secondary base plate on said base plate for sidewise adjustment of said troughs and upright support members extending up from said secondary base plate and supporting said troughs, said troughs being movable as a unit and supported on the upper ends of said upright support members for transverse movement from side to side, said secondary base plate supporting said pusher plate for guiding and sliding movement therealong thereby mounting said means for pushing said sticks.

5. A stick inserter according to claim 1 wherein said power operated means for the troughs comprises a solenoid positioned adjacent and connected to each side of the troughs for moving the troughs transverse in alternate opposite directions, said operating means connected with said means movable into and out of the trough as pusher means for pushing the sticks in the trough comprises a power cylinder having a piston and pusher plate attached thereto and insertable in said troughs, an electrically actuated valve means for connecting fluid power from a source to either end of said power cylinder, a first electrical switch associated with said pusher means and actuated thereby when said pusher means senses an empty condition in a trough, said first switch being connected to a source of electrical power and said valve means for actuating said valve means to apply power to the power cylinder to retract the same and a second electrical switch associated with said pusher means and actuated thereby when said pusher means moves to the extreme opposite position from sensing an empty trough, said second switch being connected to a source of electrical power and said valve means for actuating said valve means to apply power to the power cylinder to insert same in the troughs, said operating means connected with said power operated means for the troughs which are solenoids comprising a first on and off electrical switch connected with one of said solenoids, a second on and off electrical switch connected with the other of said solenoids, said first and second on and off switches being positioned adjacent the retracted position of said pusher plate and actuated thereby and connected to an electrical source with said solenoids whereby when one is off the other is on to energize said solenoids alternately to move said troughs transversely from side to side.

6. A stick inserter according to claim 5 wherein said frame includes a horizontally disposed base plate, said support means attached to the frame and supporting said troughs comprises a secondary base plate above said base plate, means mounting said secondary base plate on said base plate for sidewise adjustment of said troughs and upright support members extending up from said secondary base plate and supporting said troughs, said troughs being movable as a unit and supported on the upper ends of said upright supports for transverse movement from side to side, said secondary base plate supporting said pusher plate for guiding and sliding movement therealong to support and move said means for pushing said sticks.

References Cited in the file of this patent

UNITED STATES PATENTS

| | | |
|---|---|---|
| 1,953,506 | Schnaier | Apr. 3, 1934 |
| 2,190,943 | Goodman | Feb. 20, 1940 |
| 2,251,333 | Griffin et al. | Aug. 5, 1941 |
| 2,379,501 | Steiner et al. | July 3, 1945 |
| 2,625,120 | Eddy et al. | Jan. 13, 1953 |
| 2,632,681 | Newcomer | Mar. 24, 1953 |
| 2,704,442 | Nelson | Mar. 22, 1955 |
| 2,892,423 | Glass | June 30, 1959 |